Dec. 28, 1965  L. G. ROLLINS  3,225,897
CONVEYOR DEVICE
Filed Oct. 17, 1962  4 Sheets-Sheet 1
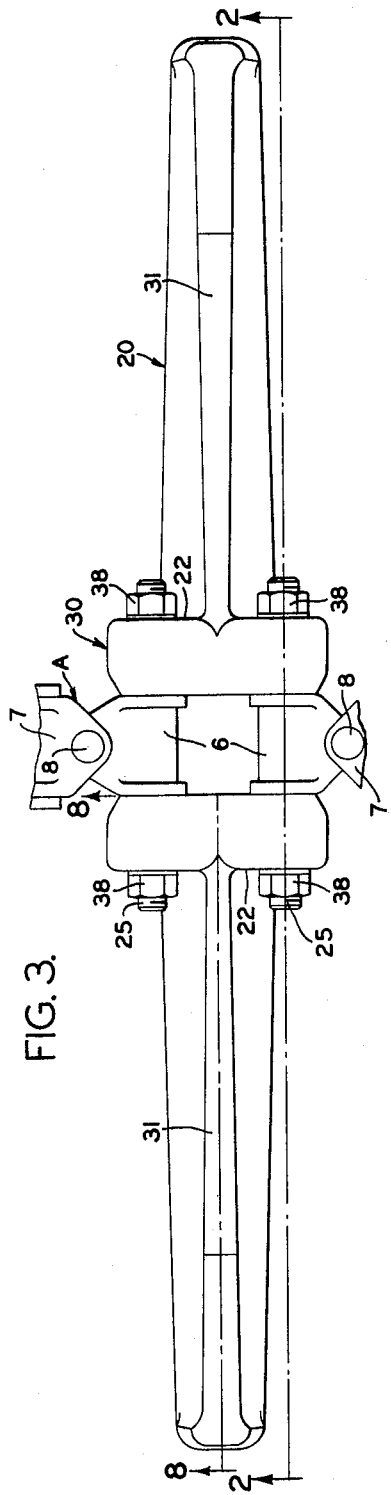
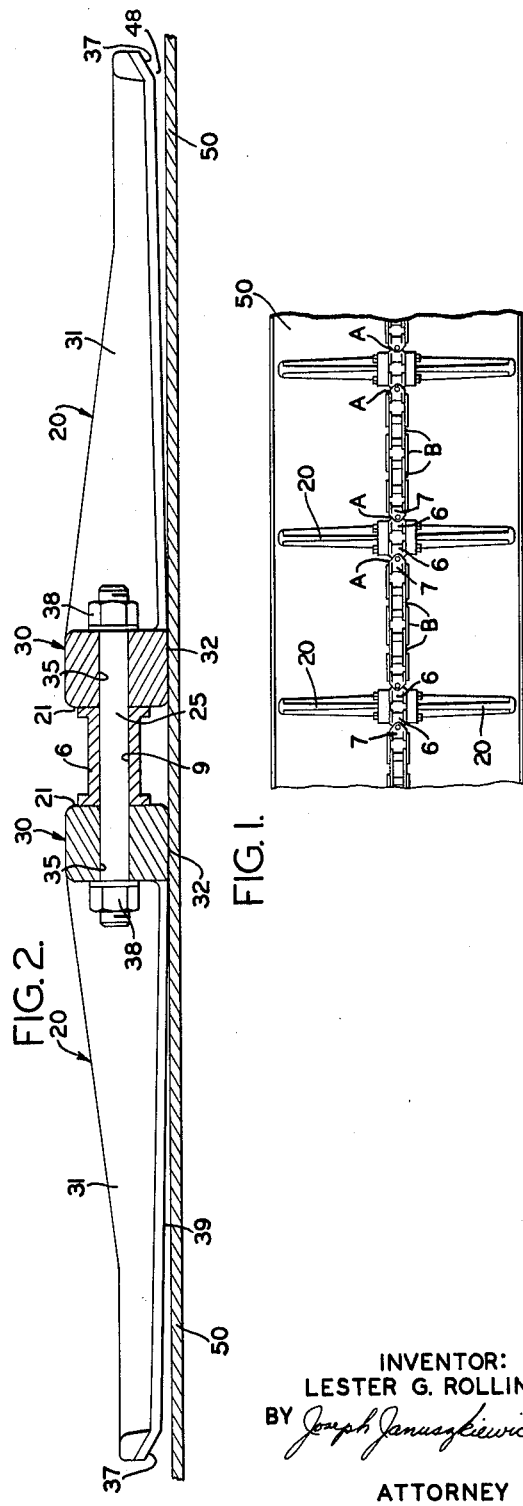
INVENTOR:
LESTER G. ROLLINS
BY *Joseph Januszkiewicz*
ATTORNEY Dec. 28, 1965  L. G. ROLLINS  3,225,897
CONVEYOR DEVICE
Filed Oct. 17, 1962  4 Sheets-Sheet 2
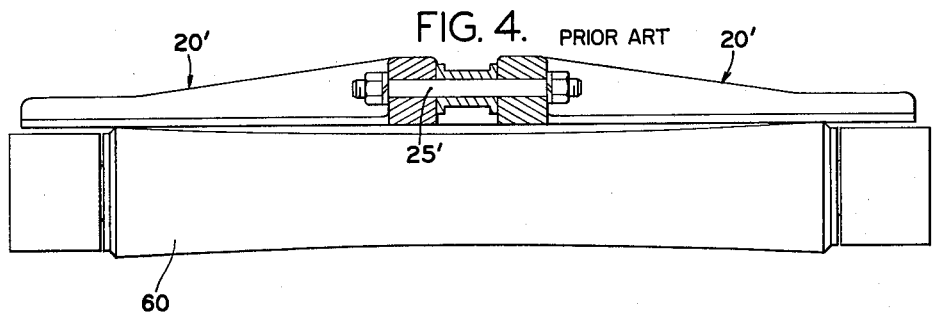
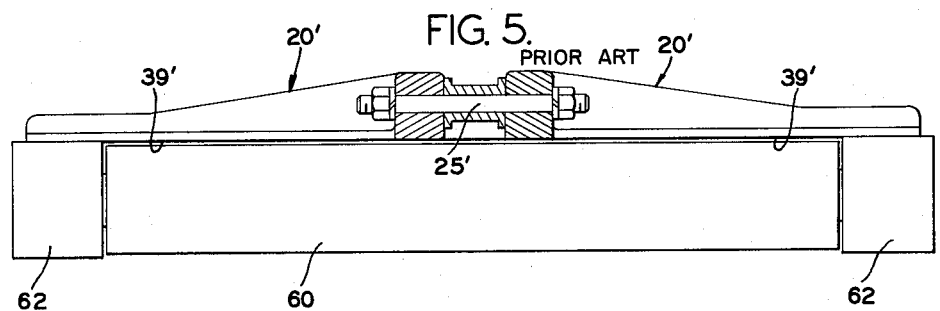
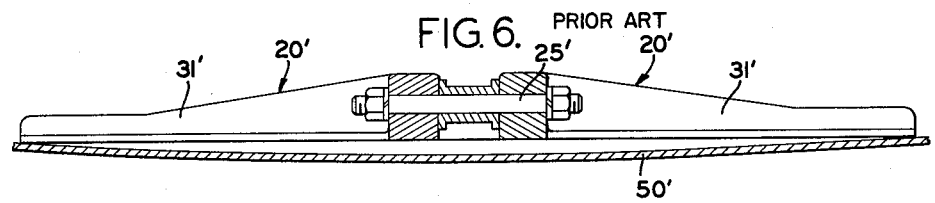
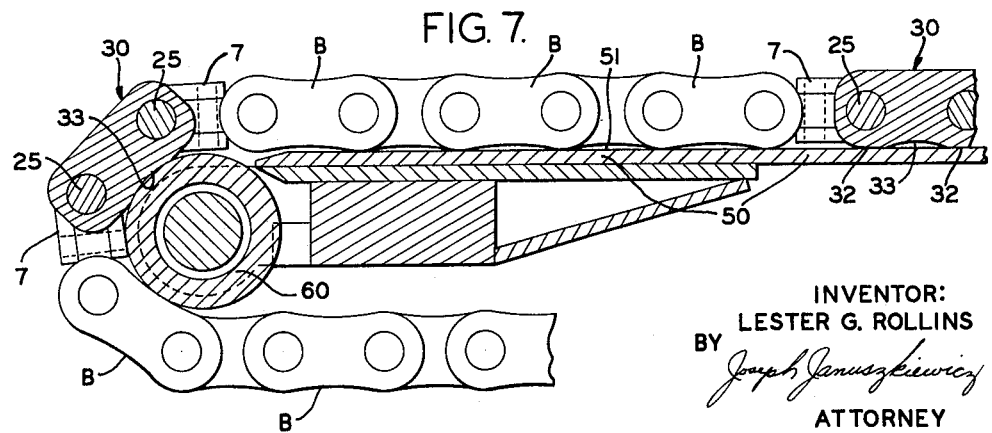
INVENTOR:
LESTER G. ROLLINS
BY
ATTORNEY Dec. 28, 1965    L. G. ROLLINS    3,225,897
CONVEYOR DEVICE
Filed Oct. 17, 1962    4 Sheets-Sheet 3
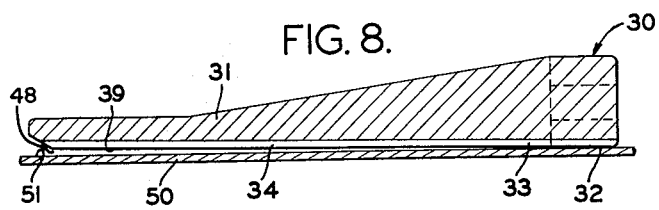
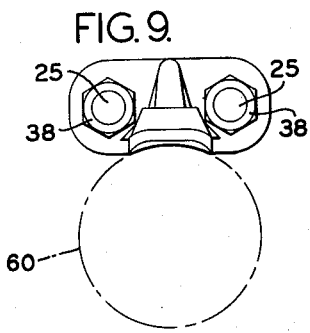
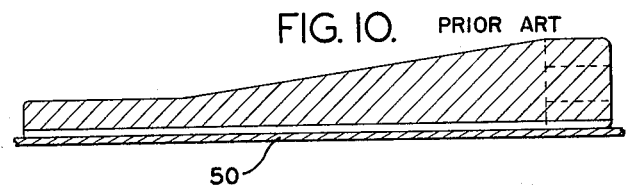
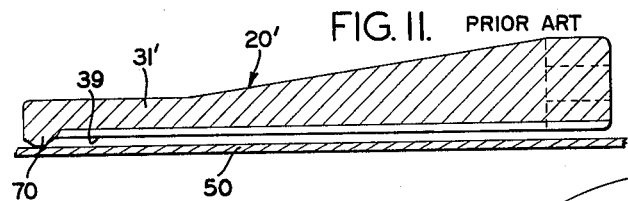
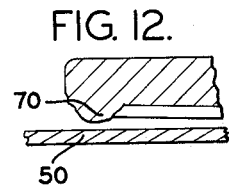
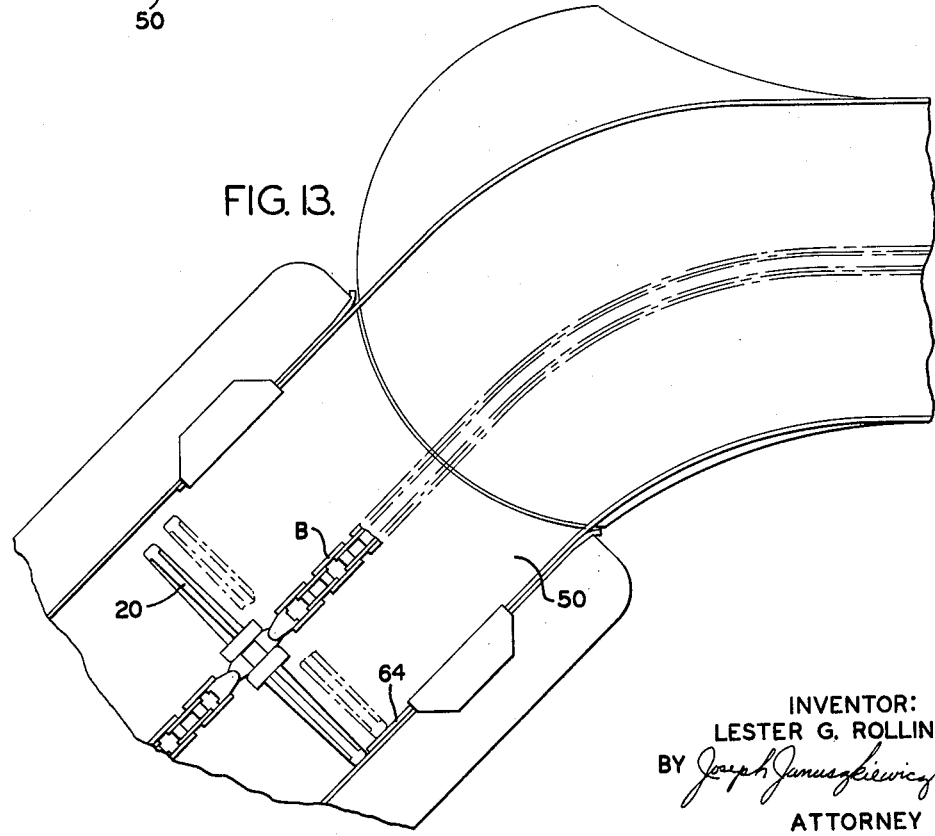
INVENTOR:
LESTER G. ROLLINS
BY *Joseph Januszkiewicz*
ATTORNEY

INVENTOR:
LESTER G. ROLLINS
BY
ATTORNEY 3,225,897
CONVEYOR DEVICE
Lester G. Rollins, Claremont, N.H.
Filed Oct. 17, 1962, Ser. No. 231,615
3 Claims. (Cl. 198—171)

This invention relates to a conveyor device and more particularly to a flight conveyor.

This application is a continuation-in-part of application Serial No. 128,227 filed July 31, 1961, now abandoned.

Conveyor devices comprising a central chain with elongated flights extending laterally oppositely from opposite sides of the central chain are extensively used for the conveying of material. Such conveyor devices commonly referred to as scraper flights are used in conjunction with flat surfaces over which they travel, wherein the laterally extending flights cooperate with the flat surfaces or deck to move material therealong. Where such conveyor devices are used on loading machines, the flights are required to move heavy material such as large masses of coal, rock, iron ore, etc. which large masses of material are moved along the deck plates by the conveyor flights. In mining machinery use, scraper flights are constructed low in height due to the requirement that the vertical height be kept to a minimum since the vertical height dimensions of a mine passageway wherein the conveyor device operates either as an individual unit or as a portion of a mining machine is required to be kept to a minimum to provide the necessary clearance between the working parts as well as the mine passageway. In addition it is necessary that the scraper flights be designed to withstand the bending and tension imparted thereto in a horizontal plane (i.e. a plane parallel to the deck surface) as well as in a vertical plane (a plane normal to the plane of the deck surface). Bending stresses in a horizontal plane are minimized by the geometry of the scraper flights wherein relatively large moments of inertia distribute the bending stresses, however, bending in a vertical plane is a serious problem to the scraper flights due to small dimensions of the flight pins which provide very small moments of inertia for withstanding the bending stresses in a vertical plane. With the increased use of high speed mining machines, conveyor chain speeds have been increased thereby further increasing the bending stresses in the vertical plane on the flight pins. Use of high speed mining equipment has also required that conveyor chains become more reliable and minimize failures thereof, therefore it is desired to provide a strong reliable scraper flight conveyor.

There are basically two separate surfaces on the scraper flight which cooperates with the deck and idler cylinder for the operation thereof. Initially the chain flights travel closely to the decks and are frequently in contact with the deck plates so that the flat portion of the chain cooperates with the deck surface to provide the guiding and conveying action. In addition, where the scraper flight is to be changed in its direction of movement for the return run as in an endless chain or orbital acting conveyor, the scraper flight cooperates with an idler cylinder or roller wherein it is desirous to have an arcuate portion of the flight cooperating with the roller to provide a smoother action.

Where the deck surfaces are uneven or becomes dished concavely due either through equipment damage or being so designed will cause the conveyor flight ends to support the chain since the center chain portion does not engage the flight deck due to such unevenness. Such conditions of the chain and conveyor flight will cause the pins that connect the flights to the conveyor chain to flex in a vertical plane causing fatigue and consequent failure thereof. Such flexing is caused either because of the weight of the large lumps or because the lumps are caught between the roof and the chain causing a downward force on the center of the conveyor which force is transferred to the flight pins for their vertical flexing.

In the second situation where the conveyor chain and accompanying scraper flights are required to ride around an idler cylinder or roller, the roller may become worn in the central portion thereof due to the greater mass flow of material at the central portion thereof and consequently the end portions of the scraper flights support the conveyor device such that the bending and flexing forces are transmitted to the flight pins of the scraper flights with a resulting failure thereof. Another problem encountered in the roller portion of the conveyor is that the idler roller supports, either through design, misalignment of parts or wear of the roller, protrudes into the path of the flight ends so that the support guides or engages the scraper flight ends causing the flight pins to be flexed in a vertical plane will contribute to the failure of the flight pins and the corresponding structures.

In addition, where the tail section of a loader is curved to discharge material to one side of the longitudinal center line of the loader, the end portions of the scraper flights will pound on the sides of the guideways causing an upsetting action thereon which in turn creates a negative dihedral wherein the end portions of the aligned scraper flights ride on the idler roller which raises the central portion of the scraper flight off the roller which thereby stresses the flight pins of the scraper flights in a vertical plane causing pin failure as well as corresponding failure of the conveyor.

In view of these conditions it is desired that the conveyor chain have the chain portion as strong as possible and that the scraper flights be so connected to the chain to eliminate the stresses formerly imparted to scraper flights of the chain structures.

The present invention provides a conveyor device with a new and improved alignment and structural relationship between the scraper flights and the central portion of chain wherein the scraper flights extend at a positive dihedral angle from the central chain portion thereby concentrating the structural stresses on the chain member which is adapted to take care of such stresses, eliminating structural weaknesses inherent in previously designed scraper flights while positively maintaining the scraper flights in fixed relationship to the central portion of the chain, thereby minimizing the stress concentrations and providing for a longer useful chain life. Thus the dished effect of the flight deck relative to the scraper flights does not impair the efficiency of the conveyor since the clearance provided at the scraper flight portions of the conveyor concentrates the stresses at the central portion thereof where the chain is constructed to take the load thereby eliminating the flexing of the pins in the vertical plane. Similarly the arcuate portion of the scraper flights extend upwardly from the chain portion to provide a clearance or positive dihedral which in cooperation with the idler roller eliminates vertical flexing of the pins and the consequent failure thereof. Additionally, the present invention tapers the end portions of the scraper flights so that the pounding action of the ends of the chain even though providing an upsetting action on the end portions does not raise the central portion of the scraper flight but rather maintains the positive dihedral angle eliminating bending of the scraper flights in a vertical plane.

A dihedral is defined as having or formed by two plane faces. Additionally, dihedral is referred to as the figure formed by two intersecting planes.

A dihedral angle is defined as the included angle between two intersecting half planes when both right and left planes are upwardly or downwardly inclined to a horizontal transverse line. A dihedral angle is right, straight, obtuse or acute. Thus an obtuse dihedral angle defines an obtuse included angle between two half planes wherein the right half plane makes an acute angle with a horizontal line and the left half plane makes an acute angle with the same horizontal line with a line bisecting the included angle being normal to the same horizontal line.

Accordingly one object of this invention is to provide a new and improved conveyor device having scraper flights which present dihedral angles with respect to the deck thereby minimizing failure of the conveyor chain device.

A further object of this invention is to provide a conveyor device having scraper flights which extend outwardly and upwardly from the conveyor chain thereby concentrating the stresses on the conveyor chain.

A further object of this invention is to provide a conveyor device having scraper flights which present dihedral angles with respect to an idler roller wherein the end portions of the flights are tapered to insure a positive dihedral angle.

Accordingly one object of this invention is to provide a new and improved conveyor device having scraper flights which present positive obtuse dihedral angles with respect to a horizontally extending deck thereby minimizing failure of the conveyor chain device.

These and other objects of the invention will become more apparent upon consideration of the following detailed description of a preferred embodiment thereof when taken in conjunction with the following drawings, in which:

FIG. 1 is a fragmentary plan view of a portion of a flight conveyor chain constructed according to the principles of this invention and its associated trough or deck;

FIG. 2 is a front elevational view of the scraper flight shown in FIG. 3 taken along line 2—2 with a portion thereof shown in cross-section in relation to the deck showing the scraper flights with a dihedral angle;

FIG. 3 is an enlarged plan view of one of the scraper flights shown in FIG. 1;

FIG. 4 is a front elevational view of a scraper flight of the prior art in cooperative relationship with an idler roller which is worn showing the flight ends in contact with the roller;

FIG. 5 is a front elevational view of a prior art scraper flight similar to that of FIG. 4 in cooperative engagement with an idler roller and its supports wherein the flight ends are engaging the support;

FIG. 6 is a front elevational view of a scraper flight of the prior art in cooperative sliding contact with a dished deck surface showing the ends of the scraper flights in contact with the deck;

FIG. 7 is a side elevational partially sectional view of an idler roller and deck surface in respective cooperative rolling and sliding engagement with a scraper flight chain showing the arcuate portion of the scraper flight in contact with the roller and another scraper flight in sliding contact with the deck;

FIG. 8 is a cross sectional view, taken substantially on line 8—8 of FIG. 3, of a portion of the scraper flight of this invention, having a positive dihedral angle in cooperative relationship with a deck surface showing the arcuate surface of the scraper flight extending the full length thereof;

FIG. 9 is a side elevational view of the scraper flight of this invention, in cooperative relationship to an idler roller showing the clearance space between the end portions of the scraper flight having a positive dihedral angle;

FIG. 10 is a cross sectional view, similar to FIG. 8, of a portion of a scraper flight of the prior art, having horizontally extending flights in close contact with a deck surface for the full length of the scraper flight;

FIG. 11 is a similar cross sectional view of the prior art scraper flight shown in FIG. 10 with the end portion thereof upset showing the ends of the scraper flights in contact with the deck;

FIG. 12 is a fragmentary cross sectional front elevational view of the end portion of the scraper flight shown in FIG. 8 with the outer end being upset showing the relation of the outer end portion of the deck surface;

FIG. 13 is a fragmentary plan view of a central portion of a loading machine showing the conveyor chain with the scraper flight end in contact with the sides of the conveyor guide;

Figure 14:
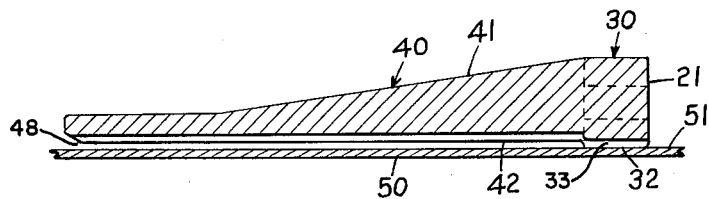
FIG. 14 is a medial, longitudinal, sectional view of a second embodiment of the scraper flight of this invention.

As is well known in the art, a flight conveyor chain (FIGS. 1–3) comprises a plurality of elongated laterally spaced pairs of links B, which pairs of links B are suitably pivotably joined at the end thereof to adjacent pair of links B by suitable extending pins respectively. In order to permit scraper flights, such as flights 20 constructed in accordance with the principles of this invention, to be connected to the chain, suitable universal joints A are connected between longitudinally spaced pairs of links B in suitable longitudinal spaced locations along the chain as desired. As is also known, each universal joint A has two generally cylindrical tubular members 6 and 7 having laterally spaced parallel axes which extend transversely of the longitudinal axis of the conveyor chain. Each member 6 and 7 has cooperable portions extending from the adjacent sides, which cooperable portions are suitably pivotally connected together by a suitable vertically extending pin 8, which pin 8 also extends perpendicular to a plane that contain the axes of the tubular members 6 and 7. Each tubular member 6 and 7 has a cylindrical bore 9 that extends laterally therethrough (FIG. 2). As shown the tubular members 6 of each joint A are located adjacent each other and are connected to the scraper flights 20 as will be more fully explained hereinafter. The tubular members 7 of each universal joint A are located remote from each other and are suitably pivotally connected to the chain links B by suitable laterally extending pins. Inasmuch as various suitable universal joints for such purpose are well known in the art, further description thereof is not believed to be warranted.

Each scraper flight 20 comprises a generally rectangular cross section base portion 30 having spaced flat coplanar bottom surfaces 32 with an intermediate arcuate portion 33 (FIGS. 7 and 8) and an upwardly vertically extending planar side surface 21 normal to the longitudinal centerline of the scraper flight 20. The flat bottom surfaces 32 slidingly engage a top surface 51 of a trough or deck 50 wherein the bottom surface 32 and top surface 51 are substantially coplanar. Each scraper flight 20 has an elongated body portion 31 generally triangular in cross section extending laterally outwardly from a side 22 which side 22 is opposite to the vertically extending side surface 21. The vertically extending side surfaces 21 of the scraper flight 20 lie in parallel adjacent relationship to the respective adjacent outer end annular surface of the adjacent tubular members 6 as is well understood in the art.

The base portion 30 of each flight 20 is provided with a pair of spaced parallel bores 35 extending therethrough whose axes are normal to the side surface 21. The spaced bores 35 are located on opposite sides of the body portion 31 respectively for a purpose to be described.

To assemble a pair of scraper flights 20 to opposite sides of the universal joint A respectively, the bores 35 of each scraper flight 20 are located so as to be aligned with the respective bores 9 of the adjacent tubular members 6 of a pair of universal joints A as clearly shown in FIG. 2. When assembled the vertically extending surface 21 of each opposed scraper flight base portion 30 lies closely adjacent the respective outer coplanar annular surfaces of the adjacent tubular members 6 leaving a clearance space therebetween as is well understood in the art. Elongated pins 25 with both ends threaded are suitably received by the respective aligned bores 35 of the base portions 30 and the bores 9 of the tubular members 6 in alignment therewith. Pins 25 may be welded to the scraper flight 20 as by tack welding or otherwise suitably connected thereto. Other construction is also within the scope of this invention. The threaded ends of the respective pins 25 suitably threadedly receive nuts 38 which are suitably secured thereon to rigidly fasten the respective scraper flight portions 20 to the universal joint A of the chain.

The elongated laterally extending body portion 31 of each scraper flight 20 is generally triangular in lateral cross section although other configurations are well within the scope of this invention, however, to simplify the explanation the cross section will be referred to as triangular. As shown in FIGS. 1 and 3 and as previously described the conveyor chain device has the bottom surface 32 of the scraper flights 20 in sliding contact with the deck 50. Each bottom surface of the laterally extending body portion 31 has spaced flat coplanar bottom surfaces 39 (FIGS. 2, 8 and 11) with an intermediate arcuate portion 34 similar to and an extension of the arcuate portion 33 of the base 30 of the scraper flight 20 which arcuate portion 34 extends for the entire length of the elongated laterally extending body portion 31. The bottom surface 39 (FIG. 2) as well as the arcuate portion 34 of the body portion 31 extends from the base portion 30 upwardly and outwardly to define an acute included angle between the bottom surface 39 of the body portion 31 and the top planar surface 51 of the deck 50, such that the respective oppositely disposed scraper flights 20 connected to the same cylindrical tubular member 6 define a positive obtuse dihedral as defined above wherein the respective bottom planar surfaces 39 of the adjacent scraper flights define intersecting planes as extended, with the angle defined between the intersecting planes as an obtuse included angle so that the body portions 31 do not engage the deck 50 whereas the bottom surface 32 of the base portion 30 slidingly contacts the top surface 51 of the deck 50 to guide the flight conveyor chain thereover. Similarly the respective arcuate portions 34 of oppositely disposed flights 20 connected to the same cylindrical tubular member 6 define a positive obtuse dihedral. FIG. 2 as disclosed exaggerates the acute included angle between the bottom surface 39 and the deck 50 to illustrate the clearance space provided at the very ends of the body portion 31 of scraper flight 20. It is within the scope of this invention to provide dihedral angles between adjacent body portions 31 of a scraper flight which provides clearance for the respective body portions relative to the deck surface even though the deck may be horizontal, concave or convex as taken on a front elevational view, such that the respective oppositely disposed body portions 31 of a scraper flight section connected to the same cylindrical tubular member 6 are inclined downwardly therefrom to define a negative dihedral angle wherein the right half plane makes an acute angle with a horizontal line where the right half plane extends downwardly from the apex and the left half plane makes an acute angle with the same horizontal line and the left half plane extends downwardly from the apex. As clearly illustrated in FIG. 2 the base portion 30 of the scraper flights 20 contacts the deck 50 thereby providing a clearance space 48 for the entire length of the laterally extending body portion 31 of the scraper flights 20 thereby minimizing contact between the respective lateral portions of the scraper flights 31 concentrating the reactive surface towards the central portion of the conveyor chain. The respective bottom surfaces 39 of the respective scraper flights 20 define an included angle therebetween which is a positive obtuse dihedral angle as opposed to a negative dihedral angle. A negative dihedral angle is illustrated by bending diametrically opposed scraper flights 20 about the axes of pin 25 so that in viewing FIG. 2 the right-hand scraper flight 20 would be rotated in a clockwise direction whereas the scraper flight 20 on the left-hand portion FIG. 3 is rotated in a counterclockwise direction, so that the respective opposed flights extend downwardly with respect to a horizontal line. The bending of the flight about pins 25 in a vertical direction is characterized by the large number of examined failures which show cracks which always start at the bottom of the flight pins and work upwardly wherein this has never been observed to be reversed such that the cracks in the pins would start at the top. The positive dihedral angle of the oppositely disposed flights 20 minimizes stress concentration whereas the negative dihedral angle in cooperative use with a horizontal conveyor deck 50 would cause flight pin fatigue and consequent failure of the scraper flight conveyor chain.

Thus where there is no dihedral angle in the respective scraper flights as in FIG. 6 wherein a scraper flight 20' similar to the described flight 20 except that the pair of adjacent laterally extending body portions 31' have flat substantially horizontally extending bottom surfaces such that in its travel over a flight deck 50' which is dished or concave either through use, wear or design, only has the respective end portions of the flights 20' contacting the deck surface so that vertical bending stresses are imparted to the flight pins 25' which is particularly damaging as where a large lump of coal located centrally on the scraper flight forces the central portion of the flight 20' downwardly as viewing FIG. 6 will impart a bending stress to the flight pins 25'. This is overcome by the obtuse dihedral angle arrangement of the body portions 31 of the scraper flight 20 as described above.

In addition where the scraper flight 20 travels over the deck 50 as described above, for the return run, an idler roller 60 (FIG. 7) is suitably journaled on the end portion of the deck to suitably direct the scraper flights and chains rearwardly below the deck 50 in a manner well understood in the art. As clearly disclosed (FIG. 7) the intermediate recess portion 33 of the base portion 30 slidingly moves over the roller 60 which in repeated use wears the roller centrally through friction, and abrasion such that idler roller 60 becomes concave or thinner at its central portion while substantially maintaining its original diameter at its outer end portions (FIG. 4) thus again subjecting the flight pins 25' to flexing and failure as discussed above. In providing the laterally extending body portions 31 of each scraper flight 20 with a bottom surface 39 as well as the intermediate arcuate portion that extends upwardly and outwardly such as 34 (FIG. 8) to define an obtuse dihedral angle the respective arcuate portions 33 of the base portions 30 of scraper flights 20 only slidingly contact the idler roller 60 with a clearance space provided between the idler roller 60 and the laterally outwardly and upwardly extending elongated body portion 31 thereby maintaining contact between the roller 60 and scraper flight 20 only at the arcuate portion 33 of base 30 and the central portion of the idler roller 60 thereby eliminating any vertical stressing on the flight pins 25 of the scraper flight 20 compared to the stressing of the flight pins 25' wherein the idler roller 60 becomes worn at the central portion thereof (FIG. 4).

Additionally as shown in FIG. 5 wherein the scraper flight 20' travels over an idler roller 60 wherein laterally spaced supports 62 rotatably support the idler roller 60 with either misalignment between the roller 60 and the support 62 or wherein the outer dimensions of the support 62 are greater or equal to the dimensions of the roller 60 such that the end portions of the bottom surface 39' of the body portions of the scraper flight 20' slidably engage the supports 62 thereby stressing the flight pins 25' (FIG. 5) in a vertical plane causing a failure thereof.

As shown in FIG. 2 of the preferred embodiment the respective end portions of the scraper flights 20 body portions 31 are tapered upwardly, or chamfered as 37 wherein the end portions of the bottom surface 39 of the body portions 31 are inclined upwardly at approximately 40° with respect to the horizontal deck surface 51. It is to be understood that the degree or amount of the inclined angle as defined by the upwardly extending end portion 57 relative to the deck surface 51 is such as to provide the necessary suitable clearance so as to provide and maintain a negative dihedral even though a lip is formed thereon which is to be explained.

In a loader machine or a mining machine wherein a conveying means is coordinated with the machine to remove mined material rearwardly from the forward portion thereof, it often becomes necessary to swing the rearward portion or tail piece to the right or the left to load of transfer the mined material, which causes the end portions of the flights 20 (FIG. 13) to travel closely adjacent the guideways 64 of the loader since the central chain is tensioned and seeks to maintain the shortest travel distance. As the central chain travels along the deck 50 the end portions of the laterally extending body portion 31 closely adjacent the guideway 64 pounds against the sides of the conveyor trough which eventually forms a lip 70 (FIGS. 11 and 12) on the end portion thereof which is an upsetting action. Where the lip 70 is formed on the end portions of a scraper flight 20 which are disposed at positive obtuse dihedrals (FIGS. 8 and 12) the lip 70 does not contact the deck 50 so that there is no interference with the normal functioning of the scraper flights. Additionally, since the end portions of the scraper flights 20 are beveled as at 37 the formation of the lip and its adverse effects as set forth below are prevented and at most, results in the filling in of the intermediate arcuate portion 34 thereby prolonging the life of the scraper flights and chain. Where the lip 70 is formed on the end portion of a scraper flight 20' (FIGS. 6, 10 and 11) which flights 20' are disposed at straight angles or substantially horizontal thereby lifting the respective base portions 30, or the central part of the conveyor device including the universal joints A up off the idle rollers 60, so that as the chain goes over the roller, chain tightness pulls the universal down against the roller, which action continually flexes the flight pins 25, fatigues and eventually breaks them. Thus, the formation of the lip 70 where the bottom of the scraper flights are in contact with the deck causes a negative dihedral. The lip 70 on the scraper flights 20 disposed at positive dihedral angles eliminates the flexing action along with the flight pin fatigues and breakage.

In FIG. 14 there is shown a second embodiment of the principles of this invention in a conveyor flight 40, similar in all respects to the flight 20 except for a major portion of the bottom surface of flight 40 shown as the bottom surface 42 of an elongated body portion 41 similar to the elongated body portion 31 of the flight 20 and having other portions and surfaces identical with those of flight 20 and indicated by the same numbers. The flight 40 has a rectangular base portion 30 having coplanar bottom surfaces 32 spaced apart by an arcuate surface 33 as hereinbefore described (see FIG. 7). The bottom surface 42 is upwardly spaced from and parallel to the plane of surfaces 32 by an amount approximately equal to the clearance 48 between the outer end of flight 20 and the deck surface 51 as shown in FIG. 2 and earlier described.

The effect of such upward spacing is the same as that of the dihedral angle of the first embodiment (flight 20) and similarly reduces vertical bending movements applied to the pins 25.

Figure 15:
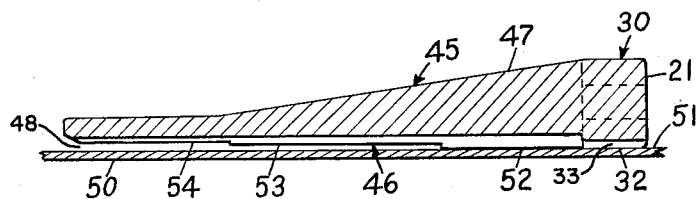
FIG. 15 is a medial longitudinal sectional view of a third embodiment of the scraper flight of this invention.

FIG. 15 shows a third embodiment of this invention in a conveyor flight 45 entirely similar to the flight 20 except for a bottom surface 46 of an elongated body portion 47 similar to the body portion 31 of flight 20 and having other portions and surfaces identical with those of flight 20 and indicated by the same numbers. The rectangular body portion 30 has the coplanar bottom surfaces 32 as in the two earlier embodiments and the bottom surface 46 has a tip clearance as at 48 approximately equal to the clearance 48 shown in FIG. 2 between the outer end portions of flight 20 and the upper surface 51 of the deck 50. Such tip clearance is produced in flight 45 by the contour of the bottom surface 46 which comprises a plurality of upwardly stepped plane surfaces 52, 53, and 54 preferably substantially parallel to the coplanar surfaces 32 and progressively upwardly spaced from the plane of surfaces 32 beginning with the surface 52 nearest the rectangular base portion 30 and very closely upwardly adjacent the deck surface 51, progressing through one or more intermediate surfaces such as 52 at an intermediate distance above the deck surface 51 and culminating in a final surface 54 at the distance shown as clearance 48 and hereinabove described.

The clearance 48 has the same effect as the tip clearance of the other two embodiments and similarly reduces the vertical bending moments applied to the pins 25.

It is to be appreciated that other methods of producing tip clearance such as, for example, the employment of various curvatures in the bottom surface of the flight are within the scope of this invention.

Having described preferred embodiments of this invention in accordance with the patent statutes, it is to be realized that modifications thereof may be made without departing from the broad spirit of this invention. Accordingly, it is respectfully requested that this invention be interpreted as broadly as possible and be limited only by the prior art.

What I claim is:

1. A conveyor apparatus comprising; an orbital tension member being disposed, through a portion of the orbit thereof, closely adjacent an elongated planar support; flight means secured to said tension member and extending outwardly therefrom and adjacent said planar support; each said flight means including a formed portion having steps on the surface thereof contiguous to said planar support with the step adjacent said tension member adapted to be in slidable contact with said planar support and the remaining step being in spaced relation to said planar support.

2. A conveyor flight comprising, a base portion having spaced side surfaces adapted to be connected to a conveyor chain with one of said side surfaces in juxtaposition therewith said base portion having a bottom support surface lying in a plane and extending from said one side surface to the other of said side surfaces for cooperative sliding contact with a planar deck surface, an elongated body portion extending outwardly from the other of said side surfaces of said base portion and said elongated body portion having a bottom surface on a major portion thereof which bottom surface lies in a plane defining with said first mentioned plane an acute included angle.

3. A conveying device as defined in claim 2 wherein said elongated body portion has end portions which taper upwardly and outwardly at an angle relative to such deck surface greater than the angle of the adjacent said other portions relative to such deck surface.

References Cited by the Examiner

UNITED STATES PATENTS

| | | | |
|---|---|---|---|
| 1,917,134 | 7/1933 | Levin | 198—171 |
| 1,920,500 | 8/1933 | Garcia | 198—171 X |
| 2,657,787 | 11/1953 | Long | 198—176 |
| 2,855,091 | 10/1958 | Frandsen | 198—182 |
| 2,931,236 | 4/1960 | Bigler | 198—171 |
| 3,045,811 | 7/1962 | Wenger | 198—224 |

FOREIGN PATENTS 35,025  9/1925  Denmark.

SAMUEL F. COLEMAN, *Primary Examiner.*

WILLIAM B. LABORDE, ERNEST A. FALLER, *Examiners.*